May 21, 1968 P. F. HAYNER ETAL 3,384,295
MINIATURE ELECTRICAL BLOWER

Original Filed Nov. 12, 1965 2 Sheets-Sheet 1

INVENTORS
Paul F. Hayner
Richard B. Henderson
Loren Dean Isley
BY Philip D. Amino
ATTORNEY May 21, 1968 P. F. HAYNER ETAL 3,384,295

MINIATURE ELECTRICAL BLOWER

Original Filed Nov. 12, 1965 2 Sheets-Sheet 2

INVENTORS
Paul F. Hayner
Richard B. Henderson
Loren Dean Isley

BY *Philip D. Amino*

ATTORNEY 3,384,295
MINIATURE ELECTRICAL BLOWER
Paul F. Hayner, Lexington, Mass., and Richard B. Henderson and Loren Dean Isley, Nashua, N.H., assignors to Sanders Associates, Inc., Nashua, N.H., a corporation of Delaware
Continuation of application Ser. No. 507,305, Nov. 12, 1965. This application Mar. 6, 1967, Ser. No. 638,676
20 Claims. (Cl. 230—117)

ABSTRACT OF THE DISCLOSURE

The present invention pertains to an electrical blower and, more particularly, to a blower which is small and compact, which is capable of causing a relatively large air flow, and which employs a fan having an umbrella-type configuration and bearing assemblies, particularly of the ring-jewel type, within which the fan is journalled.

---

The present invention is a continuation of our previously filed patent application entitled, "Electrical Blower," Ser. No. 507,305, filed Nov. 12, 1965, now abandoned.

It is therefore an object of the present invention to provide an improved electrical blower.

It is another object of the present invention to provide an electrical blower of the type described which is of small and compact design yet capable of producing a relatively large air or fluid flow.

It is a further object of the present invention to provide an electrical blower of miniature size utilizing jewel bearings.

It is still another object of the present invention to provide a miniature electrical blower employing an umbrella-type rotor assembly.

It is still a further object of the present invention to provide a miniature electrical blower having components which can be easily and simply assembled and which can be utilized for an extended period of time over an extended temperature range.

The present invention is an improvement of U.S. Patent No. 2,772,046, entitled Electric Blower, issued to George J. Shomphe on Nov. 27, 1956, and assigned to the assignee of the present invention. The present invention is an improvement over the blower described in the aforementioned U.S. patent in that the bearings utilized herein produce substantially less friction, which results in much less wear, thus lengthening the effective operating life of said blower. Also, the assembly of the instant blower is extremely easy and simple.

In accordance with the present invention there is provided an electrical blower comprising a housing having a plenum chamber formed therein and a passageway formed in one wall of the housing to conduct fluid outwardly from said chamber. Eccentrically disposed circular apertures are formed in other opposite walls of the housing for access to the chamber. Perforated circular end cap members are secured within said apertures to form walls for said chamber. Each of said end cap members has a ring-jewel bearing assembly centrally connected thereto. One of said end caps includes a centrally disposed hollow shaft member extending transversely thereof, said shaft member being disposed within said chamber and having a reduced end portion upon which is press-fitted a motor stator. The stator includes a core and field windings and is adapted to produce a rotating electric current when connected to an appropriate source of current. An umbrella-type rotor or fan having an integrally formed spindle centrally disposed therein is journalled within the ring-jewel bearing assemblies in said end caps, by means of pivots or trunnions which extend axially outward from said spindle, said rotor being disposed within said chamber and rotatable about the axis of said spindle. The umbrella-type rotor or fan includes a ring member disposed therewithin in spaced encircling relationship with said stator core, whereby the rotating field around the core causes rotational movement of said fan, thus effecting the outward flow of air through said passageway.

The present invention permits construction of a very small electrical blower which may effectively be utilized in conjunction with electronic equipment, wherein it can be incorporated into the design of said equipment to dissipate the heat generated thereby.

Other objects, features and advantages of the present invention will become more apparent from the following discussion, when considered in conjunction with the accompanying drawings, wherein.

Figure 1:
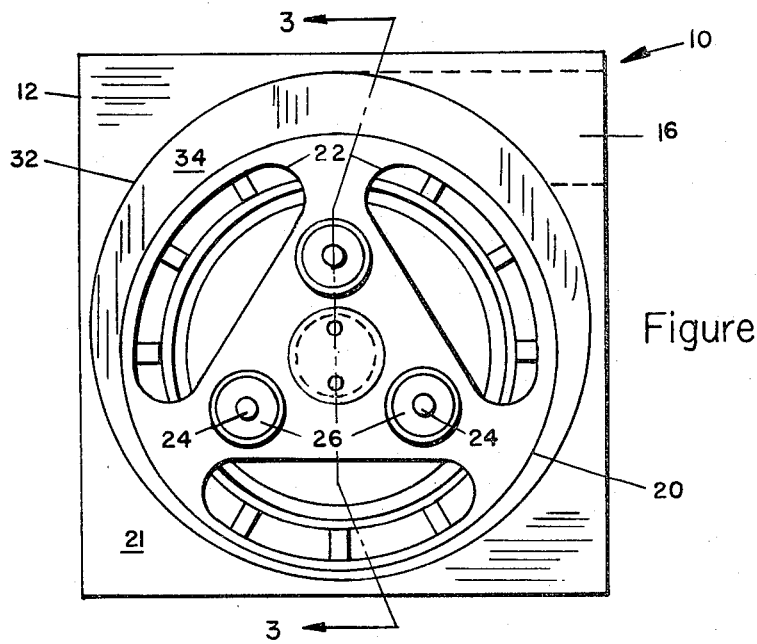
FIGURE 1 is an end view of the electrical blower of the present invention depicting the electrical terminals and air inlet openings.

Referring now to the drawings, there is shown an electrical blower 10 constructed in accordance with the present invention. The blower consists of a casing or housing 12 which has a square configuration, and which may be formed from metal or plastic. The housing has a plenum chamber 14 extending therethrough which is of generally involute shape, having a tangential outlet or passageway 16 through one face of said housing for conducting air from said chamber outwardly of said housing.

The housing may have the involute chamber and tangential outlet machined therein, or the same may be molded or formed by die-casting. Although the housing has been shown and described as having a square configuration, it will be apparent that said housing may have any desired external configuration; however, the same must be provided with an involute-shaped chamber in which the motor and rotor elements are disposed.

End cap member 18 is in the form of a perforated circular disc and is transversely mounted within a circular recess 20 in the end of the housing, which end forms one of the end walls 21 for the chamber 14. Perforations or apertures 22 are formed in said end cap and serve as air inlets. Terminal lugs 24 are supported in end cap 18 by insulating bushings 26. The end cap 18 has a centrally disposed threaded bore 28 into which is threadedly inserted a ring-jewel bearing assembly 30.

As most clearly shown in FIGURE 1, end wall 21 of the housing 12 has a concentric circular aperture 32 formed therein; and a toroidal shoulder 34 is inserted into said aperture and secured therein. The opening in said toroidal shoulder defines the circular recess 20, which recess is eccentrically disposed with respect to said end wall and said aperture 32. It is thus seen that whenever the end cap 18 is inserted into the recess 20, the bearing assembly is eccentrically oriented in the same manner with respect to the aperture 32, thus deleting any requirement for precisely inserting said end cap 18 in said recess 20. The purpose of orienting the bearing assembly in a specific manner will become more apparent from the discussion to follow hereinafter.

The end cap member 18 includes a centrally disposed transverse hollow shaft 36 which extends inwardly and which is disposed within the plenum chamber 14, and which has a shank portion 38 at the end thereof upon which is press-fitted a motor stator, generally indicated by the reference numeral 40. It is to be noted that the perforated circular disc, the input terminals, the ring-jewel bearing assembly, the hollow shaft and the stator are formed as an integral unit, viz., the end cap member 18.

Figure 2:
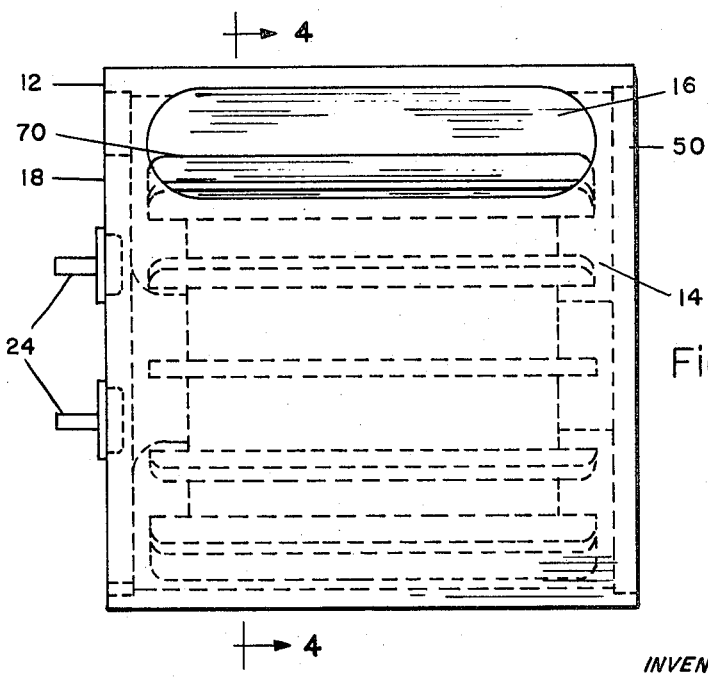
FIGURE 2 is a side view of the electrical blower depicted in FIGURE 1, showing the air outlet thereof.
Figure 5:
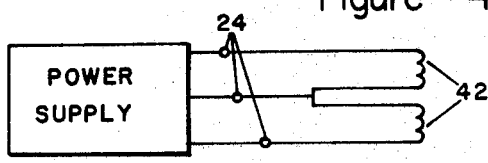
FIGURE 5 is a circuit diagram showing the blower connected to a polyphase source.

The stator 40 comprises a laminated slotted core 42 having field windings 44 placed therein in a manner conventional for polyphase windings, so that when the three terminal lugs 24 are connected to a suitable polyphase power supply, as shown in FIGURE 5, there is produced a rotating field around the core 42. Windings 44 are sealed by an insulating material 46, which is molded or otherwise secured over the ends of said windings on the stator 40. Wires 48 are interconnected between polyphase winding 44 and terminal lugs 24, as best seen in FIGURE 2.

End cap member 50 is also in the form of a perforated circular disc, and has apertures 52 formed therein which serve as air inlets. The end cap member 50 is mounted in a circular recess 54 formed in the end wall 55 of the housing 12 by another toroidal shoulder 56. The end cap member has a centrally disposed threaded bore 58 into which is threadedly inserted another ring-jewel bearing assembly 60.

The end cap members 18 and 50 are firmly secured in place within the recesses 20 and 54, respectively, such as by staking or by any other suitable method.

Figure 3:
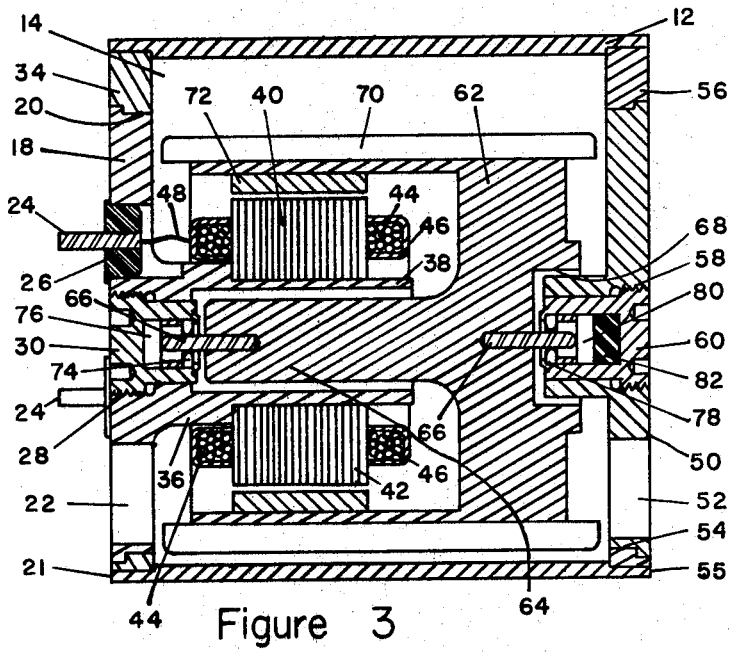
FIGURE 3 is a sectional view taken on the line 3—3 of FIGURE 1.
Figure 4:
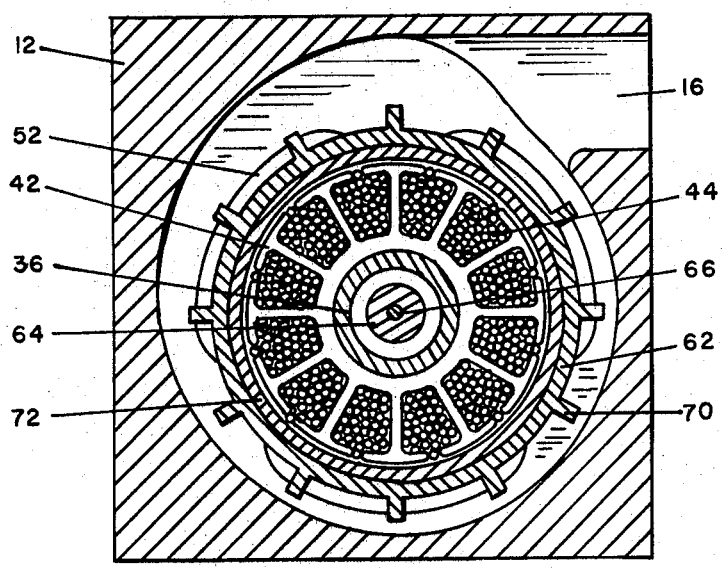
FIGURE 4 is a sectional view taken on the line 4—4 of FIGURE 2.

The blower rotor or impeller 62, which is of umbrella-type construction (as best seen in FIGURE 3), acts as a centrifugal fan. The rotor includes an axially extending centrally disposed spindle 64 therewithin and formed integrally therewith, said spindle having pivots or trunnions 66 extending axially outwardly from the respective ends thereof. Alternately, the trunnions 66 can be formed by inserting a rod axially through said spindle and securing the same therewithin. The top of the rotor has a centrally disposed recess 68 therein, and one of the trunnions 66 protrudes therethrough and is journalled in the ring-jewel bearing assembly 60; while the other of said trunnions is journalled in the ring-jewel bearing assembly 30. It is herein to be noted that the free-end portion of the spindle 64 is disposed within the hollow shaft member 36 and free to rotate therewithin. Radial fins 70 extend axially of said rotor around the outer peripheral surface thereof and are preferably formed integrally therewith. It will be noted that the ends of fins 70 extend beyond said rotor into the space between the top of the rotor and the cap member 50, and the space between the stator 40 and the end cap 18, to form therewith radial passages through which air is caused to flow by centrifugal force from the inlet openings 22 and 52 into the plenum chamber 14 and thence outwardly therefrom through the passageway 16. A hysteresis ring 72 is disposed within said rotor and secured thereto, for rotation therewith. The ring 72 is spaced from the core 40 such as to cause magnetic polarization to be induced therein, which, in conjunction with the rotating field from said stator, effects rotation of said ring. Since the ring 72 is connected to the rotor 62, rotation of the rotor or centrifugal fan results.

The ring-jewel bearing assembly 30 includes an annular jewel bearing 74 and a substantially circular endstone jewel bearing 76. The jewel bearings are preferably made of synthetic sapphires; however, other similar synthetic jewels may also be utilized in said bearing assembly. The bearing assembly also has a high temperature lubricant inserted therein, such as by means of a hypodermic needle. The jewel bearing assembly 60 is similar to jewel bearing assembly 30 and includes an annular jewel bearing 78 and a substantially circular endstone jewel bearing 80, similar to the bearings 74 and 76, respectively, of bearing assembly 30. The bearing assembly 60 is slightly longer than that of bearing assembly 30, in that it is provided with a resilient member 82, which may be formed of rubber, positioned in abutting relationship with the endstone jewel bearing 80. The resilient member serves to effectively spring load said endstone bearing 80 to permit the same, and thus the rotor, to absorb environmental shock and vibration.

It is to be noted that, since the bearing assemblies 30 and 60 are centrally disposed within end cap members 18 and 50, respectively, the same are always in axial alignment with one another, no matter how said end caps are inserted into their respective recesses. Thus the spindle 64 and, more particularly, the trunnions 66 thereof are always correctly journalled within said bearing assembly; i.e., the same are in axial alignment. It will be appreciated that the above-described construction obviates the requirement of any precise assembly and alignment procedure of the end cap members 18 and 50, thus greatly simplifying the assembly of the blower 10.

As previously discussed, any suitable materials may be used in the construction of the electrical blower of the present invention. However, in a preferred embodiment, for ease of manufacture, it has been found that the housing 12 and caps 18 and 50 can be made from aluminum, as can the rotor member 62. The trunnions 66 are made of tungsten carbide. The ring 72 is made of chrome steel, while the laminated core 40 is made of transformer steel.

It is thus seen that we have provided a new and novel electrical blower of miniature size, which can be manufactured and assembled easily and simply, and which can be utilized for extended periods of time over extended temperature ranges.

While we have shown and described the preferred embodiment of the present invention, it will be apparent that many modifications and changes may be made therein without departing from the spirit and scope of the invention as defined in the appended claims.

What is claimed is:

1. An electrical blower comprising a housing having a plenum chamber formed therein and a passageway formed in one wall of said housing to conduct fluid outwardly from said chamber, apertures formed in other opposite walls of said housing for access to said chamber, each of said opposite walls having a bore formed therein, said bores being eccentrically disposed with respect to said opposite walls and in axial alignment with one another, bearing assemblies disposed within each of said bores, one of said opposite walls having a hollow eccentrically disposed transverse member connected thereto, said transverse member projecting inwardly into said chamber, field windings including a core mounted upon said transverse member for producing a rotating field when connected to a source of current, electrical conductors extending from said field winding to input terminals, and a fan having an umbrella-type configuration and including an axially extending centrally disposed spindle, said spindle having trunnions extending axially outward from the ends thereof and journalled in said bearings, said spindle and said bearings being in axial alignment, said fan being mounted for rotation about the axis of said spindle and including a ring member encircling and spaced from said core whereby the rotating field around said core effects rotation of said fan.

2. An electrical blower in accordance with claim 1, wherein said core is of the slotted laminated type having said field winding wound thereon, said field winding being adapted to produce a rotating field when connected to a source of polyphase current, and wherein one of said other opposite walls of said housing has three symmetrically disposed arms extending radially outwardly from said bore therein, said arms being connected to said field winding by said electrical conductors, said arms serving as the input terminals of said blower.

3. An electrical blower in accordance with claim 2, wherein said hollow transverse member is formed integrally with said one of said other opposite walls of said housing and includes a shank portion at the end thereof, said laminated core and said field winding being press-fitted upon said shank portion, whereby said one of said other opposite walls, said input terminals, said laminated core and said field winding are formed as an integral assembly and secured to said housing as an integral unit.

4. An electrical blower in accordance with claim 2, wherein said fan and said axially extending spindle are formed integrally with one another, and wherein said bearing assemblies are of the ring-jewel type, whereby rotational movement of said fan causes concomitantly therewith rotational movement of said spindle journalled in said ring-jewel bearing assemblies.

5. An electrical blower in accordance with claim 4, wherein said fan includes a cylindrical sleeve having axially extending radial fins secured to the outer peripheral surface thereof, said fins being longer than the axial length of said sleeve and projecting into the spaces between the ends thereof and said other opposite walls, and wherein said means to permit the flow of fluid inwardly to said plenum chamber comprises perforations formed in said other opposite walls.

6. An electrical blower in accordance with claim 5, wherein one of said ring-jewel bearing assemblies has a resilient member therein, said resilient member serving to absorb environmental shock and vibration imparted to said blower.

7. An electrical blower in accordance with claim 2, wherein said fan and said axially extending spindle are formed integrally with one another, and wherein said bearing assemblies are of the ring-jewel type, whereby rotational movement of said fan causes concomitantly therewith rotational movement of said spindle journalled in said ring-jewel bearing assembly.

8. An electrical blower in accordance with claim 7, wherein said fan includes a cylindrical sleeve having axially extending radial fins secured to the outer peripheral surface thereof, said fins being longer than the axial length of said sleeve and projecting into the spaces between the ends thereof and said other opposite walls, and wherein said means to permit the flow of fluid inwardly to said plenum chamber comprises perforations formed in said other opposite walls.

9. An electrical blower in accordance with claim 8, wherein one of said ring-jewel bearing assemblies has a resilient member therein, said resilient member serving to absorb environmental shock and vibration imparted to said blower.

10. An electrical blower in accordance with claim 1, wherein said bearing assemblies are of the ring-jewel type and the trunnions journalled therein are formed from tungsten carbide.

11. An electrical blower comprising a housing having a plenum chamber formed therein and a passageway formed in one wall of said housing to conduct fluid outwardly from said chamber, circular apertures formed in other opposite walls of said housing for access to said chamber, said circular apertures being eccentrically disposed with respect to said opposite walls, perforated circular discs secured within said apertures to form walls for said chamber, each of said circular discs having concentric bores formed therein, bearing assemblies disposed within each of said bores, said bearing assemblies being in axial alignment irrespective of the angular rotation of said discs, one of said discs having a hollow centrally disposed transverse member connected thereto, said transverse member projecting inwardly into said chamber, field windings including a core mounted upon said transverse member for producing a rotating field when connected to a source of current, electrical conductors extending from said field winding to input terminals, and a fan having an umbrella-type configuration and including an axially extending centrally disposed spindle, said spindle having trunnions extending axially outward from the ends thereof and journalled in said bearings, said spindle and said bearings being in axial alignment, said fan being mounted for rotation about the axis of said spindle and including a ring member encircling and spaced from said core whereby the rotating field around said core effects rotation of said fan.

12. An electrical blower in accordance with claim 11, wherein said core is of the slotted laminated type having said field winding wound thereon, said field winding being adapted to produce a rotating field when connected to a source of polyphase current, and wherein said one of said discs has three symmetrically disposed arms extending radially outwardly from said bore therein, said arms being connected to said field winding by said electrical conductors, said arms serving as the input terminals of said blower.

13. An electrical blower in accordance with claim 12, wherein said hollow transverse member is formed integrally with said one of said discs and includes a shank portion at the end thereof, said laminated core and field winding being press-fitted upon said shank portion, whereby said one of said discs, said input terminals, said laminated core and said field winding are formed as an integral assembly and secured to said housing as an integral unit.

14. An electrical blower in accordance with claim 12, wherein said fan and said axially extending centrally disposed spindle are formed integrally with one another, and wherein said bearing assemblies are of the ring-jewel type, whereby rotational movement of said fan causes concomitantly therewith rotational movement of said spindle journalled in said ring-jewel bearing assemblies.

15. An electrical blower in accordance with claim 16, wherein said fan includes a cylindrical sleeve having axially extending radial fins secured to the outer peripheral surface thereof, said fins being longer than the axial length of said sleeve and projecting into the spaces between the ends thereof and said end walls, and said perforations in said circular discs serving as inlet apertures for the flow of fluid into said plenum chamber.

16. An electrical blower in accordance with claim 15, wherein one of said ring-jewel bearing assemblies has a resilient member therein, said resilient member serving to absorb environmental shock and vibration imparted to said blower.

17. An electrical blower in accordance with claim 13, wherein said fan and said axially extending centrally disposed spindle are formed integrally with one another, and wherein said bearing assemblies are of the ring-jewel type, whereby rotational movement of said fan causes concomitantly therewith rotational movement of said spindle journalled in said ring-jewel bearing assembly.

18. An electrical blower in accordance with claim 17, wherein said fan includes a cylindrical sleeve having axially extending radial fins secured to the outer peripheral surface thereof, said fins being longer than the axial length of said sleeve and projecting into the spaces between the ends thereof and said opposite walls, and said perforations in said circular discs serving as inlet apertures for the flow of fluid into said plenum chamber.

19. An electrical blower in accordance with claim 18, wherein one of said ring-jewel bearing assemblies has a resilient member therein, said resilient member serving to absorb environmental shock and vibration imparted to said blower.

20. An electrical blower in accordance with claim 11, wherein said bearing assemblies are of the ring-jewel type and the trunnions journalled therein are formed from tungsten carbide.

References Cited

UNITED STATES PATENTS 1,921,218  8/1933  Colby _____ 230—117
2,772,046  11/1956 Shomphe _____ 230—117
2,855,141  10/1958 Van Rijn _____ 230—117

FOREIGN PATENTS 1,053,645  3/1959  Germany.

ROBERT M. WALKER, *Primary Examiner.*